No. 690,020. Patented Dec. 31, 1901.
T. A. EDGERLY.
DRAFT EQUALIZER.
(Application filed Oct. 7, 1901.)
(No Model.)
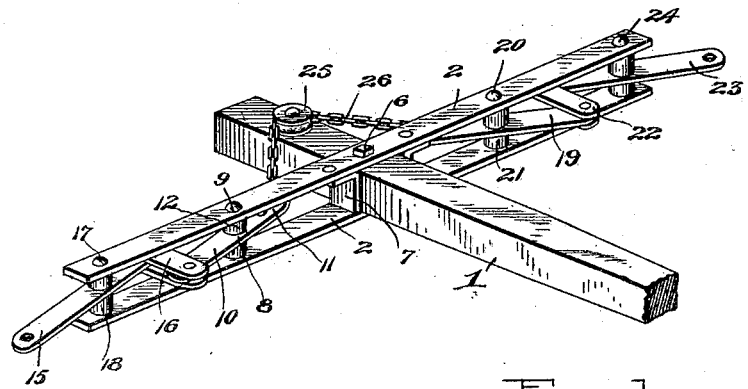
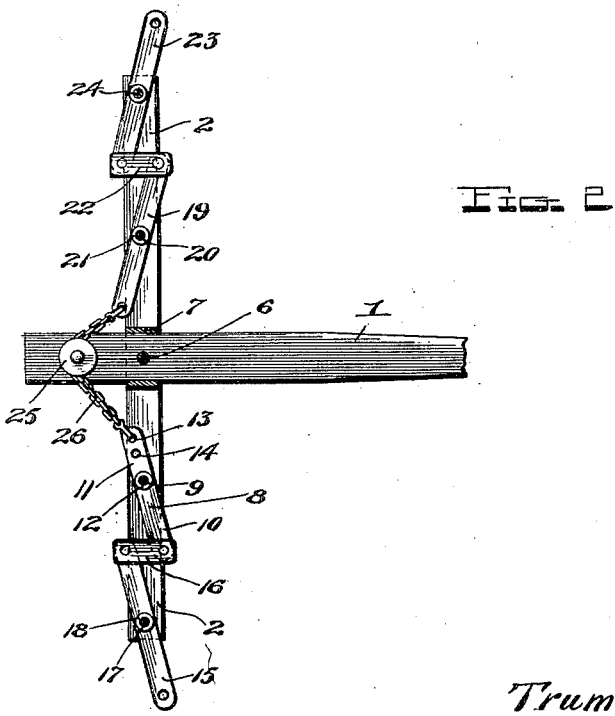
Inventor
Truman A. Edgerly
Witnesses
By H. B. Willson & Co.
Attorneys

UNITED STATES PATENT OFFICE.

TRUMAN A. EDGERLY, OF BILLINGS, OKLAHOMA TERRITORY.

DRAFT-EQUALIZER.

SPECIFICATION forming part of Letters Patent No. 690,020, dated December 31, 1901.

Application filed October 7, 1901. Serial No. 77,886. (No model.)

*To all whom it may concern:*

Be it known that I, TRUMAN A. EDGERLY, a citizen of the United States, residing at Billings, in the county of Noble and Territory of Oklahoma, have invented certain new and useful Improvements in Draft-Equalizers; and I do declare the following to be a full, clear, and exact description of the invention, such as will enable others skilled in the art to which it appertains to make and use the same.

The invention relates to draft-equalizers.

The object of the invention is to provide a draft-equalizer which shall be simple of construction, durable in use, comparatively inexpensive of production, and by means of which three or four horses may be used—two or three upon one side of the pole and one upon the other side—and the draft of said horses be equalized, so as to prevent side draft.

With this and other objects in view the invention consists of certain novel features of construction, combination, and arrangement of parts, which will be hereinafter more fully described, and particularly pointed out in the appended claims.

In the accompanying drawings, Figure 1 is a perspective view of my improved draft-equalizer, and Fig. 2 is a top plan view with the upper section of the draft-bar removed.

Referring to the drawings, 1 denotes the pole or tongue of a vehicle or agricultural machine, and 2 denotes the draft-bar, which consists of two parallel parts, one secured to the under side and the other to the upper side of the bar by a bolt 6, which extends through said bars of the pole, and by angular plates 7, which are riveted to one section of the bar and extend down along one of the sides of the pole and prevents the same from shifting upon the bolt which connects the draft-bar to the pole.

8 denotes a lever pivoted upon a bolt 9, so as to produce long and short ends 10 and 11, and is held in position by short sleeves 12, which are arranged upon said bolt. This lever has two or more perforations 13 and 14 and is connected to a lever 15 by a link 16, said lever being centrally pivoted by a bolt 17, provided with short sleeves 18. To the outer ends of the lever 15 is adapted to be attached a one-horse draft appliance.

19 denotes a lever pivoted upon a bolt 20, which is provided with short sleeves 21 and is pivotally connected by a link 22 to a lever 23, which is centrally pivoted to the draft-bar by a pivot 24 and is adapted to have attached to its outer end a two or three horse draft appliance.

25 denotes a pulley mounted upon the rear end of the tongue or pole, and 26 denotes a chain having hooks at its ends to engage the aperture in the inner end of the lever 19 and one of the apertures of the lever 8.

When one horse is attached to the free end of the lever 15 and two horses are attached to the free end of the lever 23, the hook at the end of the chain is engaged with the aperture 13, and the pull of one horse will equalize the pull of the two horses, thus preventing side draft. If three horses are attached to the free end of the lever 23, the hook at the end of the chain will be engaged with the aperture 14 of the lever 8. Said aperture 14 being located near the pivotal point of the lever 8 with the draft-bar will permit the pull of the one horse attached to the lever 15 to equalize the pull of the three horses attached to the lever 23.

From the foregoing description, taken in connection with the accompanying drawings, the construction, mode of operation, and advantages of my invention will be understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a pole, of a draft-bar fixed thereto and extending crosswise thereof, a pulley mounted upon the pole, an inner set of levers pivoted to the draft-bar, one of the levers of said set being pivoted centrally of its length while the other is pivoted eccentrically, an outer set of levers pivoted to said draft-bar, links pivotally connecting the outer set of levers with the inner set of levers, and a flexible connection engaged with said pulley and connected to the innermost ends of the inner set of levers, substantially as set forth.

2. The combination with a pole, of a draft-bar fixed thereto and consisting of two parts bolted together and to the pole and spaced apart, angular plates having their horizontal portions riveted to the upper part of the draft-bar and their vertical portions bearing against the opposite sides of the pole, pivotal bolts connecting the two parts of said draft-bars and each provided with two short sleeves, of an inner set of levers pivoted upon the innermost pivotal bolts between said sleeves, one of the levers of said set being pivoted centrally its length and the other eccentrically, an outer set of levers pivoted to the outermost pivotal bolt between the sleeves thereon, and links pivotally connecting the levers of the inner set with the levers of the outer set, a pulley carried by the pole, and a flexible connection engaged with the pulley and connected to the inner ends of the innermost levers, substantially as set forth.

In testimony whereof I have hereunto set my hand in presence of two subscribing witnesses.

TRUMAN A. EDGERLY.

Witnesses:
F. L. JOSLYN,
T. M. MILLER.